United States Patent
Lubbers et al.

(10) Patent No.: US 7,882,271 B2
(45) Date of Patent: Feb. 1, 2011

(54) PROCESSOR PARTNERING IN A STORAGE SYSTEM

(75) Inventors: Clark Edward Lubbers, Colorado Springs, CO (US); Robert George Bean, Colorado Springs, CO (US); Randy L. Roberson, Spring Hill, FL (US)

(73) Assignee: Seagate Technology LLC, Scotts Valley, CA (US)

( * ) Notice: Subject to any disclaimer, the term of this patent is extended or adjusted under 35 U.S.C. 154(b) by 208 days.

(21) Appl. No.: 11/830,201

(22) Filed: Jul. 30, 2007

(65) Prior Publication Data

US 2009/0037608 A1 Feb. 5, 2009

Related U.S. Application Data

(63) Continuation-in-part of application No. 11/144,468, filed on Jun. 2, 2005, now Pat. No. 7,260,681.

(51) Int. Cl.
*G06F 3/00* (2006.01)
*G06F 13/00* (2006.01)

(52) U.S. Cl. .............................. 710/5; 710/33; 711/118; 707/694

(58) Field of Classification Search .................. None
See application file for complete search history.

(56) References Cited

U.S. PATENT DOCUMENTS

| | | | |
|---|---|---|---|
| 6,047,357 A * | 4/2000 | Bannon et al. | 711/133 |
| 6,161,192 A * | 12/2000 | Lubbers et al. | 714/6 |
| 6,581,130 B1 * | 6/2003 | Brinkmann et al. | 710/306 |
| 6,904,498 B2 * | 6/2005 | Stolowitz | 711/114 |
| 7,028,297 B2 * | 4/2006 | Horn et al. | 718/100 |
| 7,426,611 B1 * | 9/2008 | Gupta et al. | 711/119 |
| 7,562,203 B2 * | 7/2009 | Scott et al. | 711/165 |
| 7,761,650 B2 * | 7/2010 | Lubbers et al. | 711/100 |
| 2004/0128433 A1 * | 7/2004 | Bains | 711/106 |
| 2006/0146814 A1 * | 7/2006 | Shah et al. | 370/389 |
| 2006/0218362 A1 * | 9/2006 | McManis | 711/162 |
| 2007/0050538 A1 * | 3/2007 | Northcutt et al. | 711/112 |
| 2008/0016254 A1 * | 1/2008 | Kruger et al. | 709/251 |
| 2009/0006716 A1 * | 1/2009 | Lubbers et al. | 711/100 |

* cited by examiner

*Primary Examiner*—Henry W Tsai
*Assistant Examiner*—Michael Sun
(74) *Attorney, Agent, or Firm*—McCarthy Law Group

(57) ABSTRACT

An apparatus and associated method are provided for performing a storage transaction associated with a network I/O command by employing an ASIC having an interconnect selectively coupling a plurality of dedicated purpose function controllers in the ASIC to a policy processor via a list manager in the ASIC communicating on a peripheral device bus to which the policy processor is connected.

20 Claims, 7 Drawing Sheets

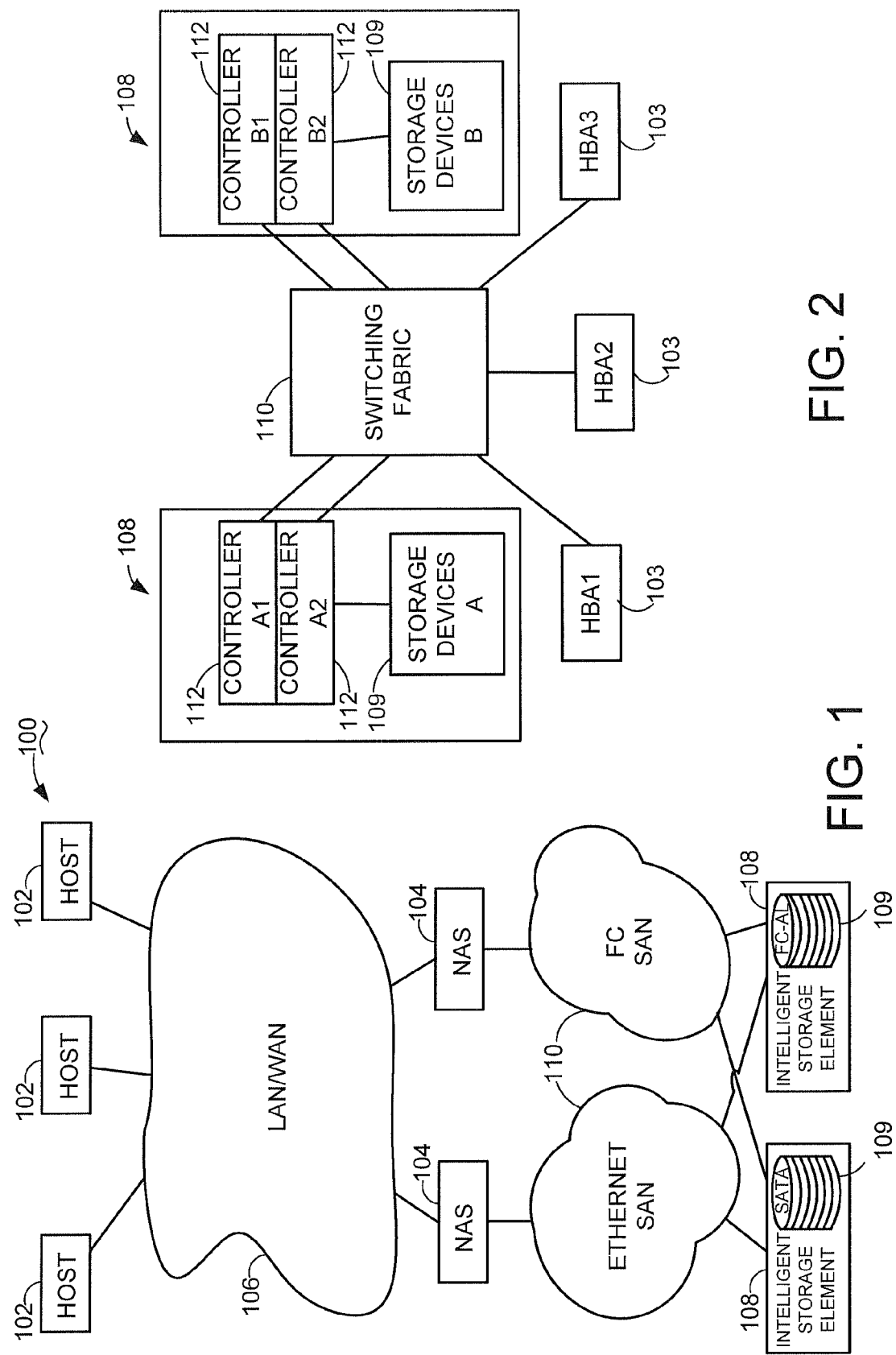

PROCESSOR PARTNERING IN A STORAGE SYSTEM

CROSS REFERENCE TO RELATED APPLICATIONS

This application is a continuation-in-part of application Ser. No. 11/144,468 filed on Jun. 2, 2005 now U.S. Pat. No. 7,260,681.

FIELD OF THE INVENTION

Embodiments of the present invention relate generally to the field of data storage systems and more particularly, but not by way of limitation, to the processing of data transactions in response to network I/O commands in a distributed array storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY OF THE INVENTION

Embodiments of the present invention are generally directed to data transactions in a storage array.

In some embodiments a storage system is provided that is configured for performing a storage transaction associated with a network I/O command. The storage system employs an ASIC having an interconnect selectively coupling a plurality of dedicated purpose function controllers in the ASIC to a policy processor via a list manager in the ASIC communicating on a peripheral device bus to which the policy processor is connected.

In some embodiments a method is provided for processing storage transactions in a storage system. The method includes receiving an access command from a network device by a dedicated purpose host exchange function controller within an application specific integrated circuit (ASIC); posting a command associated with the access command by the host exchange function controller to a policy processor via a list manager in the ASIC and a peripheral device bus to which the policy processor is connected; and decoding the command with the policy processor.

In some embodiments a storage system is provided employing an intelligent storage processor ASIC having a plurality of dedicated purpose function controllers selectively coupled to a plurality of list managers, and means for processing input/output (I/O) transactions with the intelligent storage processor by maintaining top level control for all I/O transactions by a policy processor peripheral device to the ASIC.

These and various other features and advantages which characterize the claimed invention will become apparent upon reading the following detailed description and upon reviewing the associated drawings.

BRIEF DESCRIPTION OF THE DRAWINGS

FIG. 1 is a diagrammatic representation of a computer system constructed in accordance with embodiments of the present invention.

FIG. 2 is a simplified diagrammatic representation of a portion of the computer system of FIG. 1.

DETAILED DESCRIPTION

Figure 3:
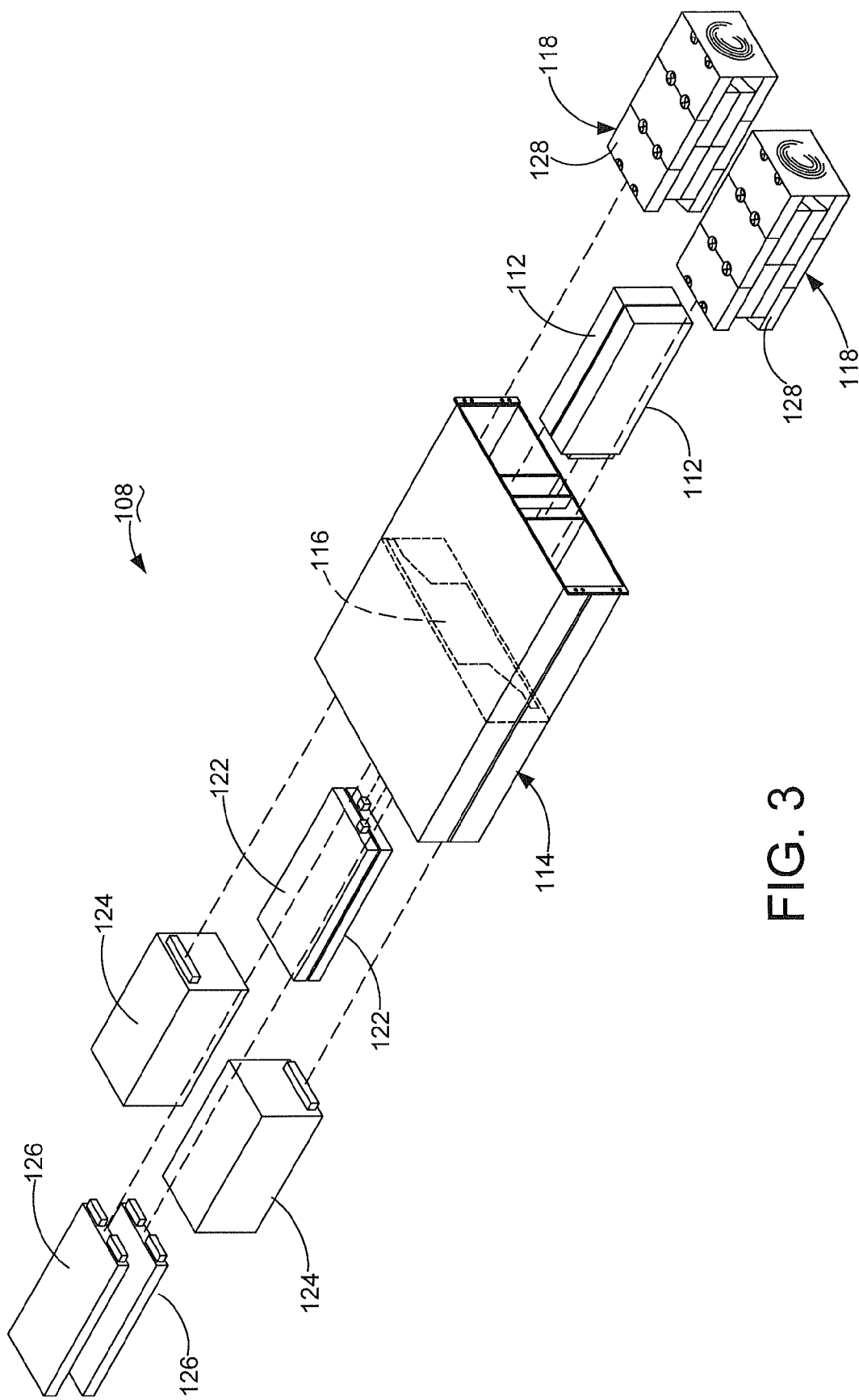
FIG. 3 is an exploded isometric view of an intelligent storage element constructed in accordance with embodiments of the present invention.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

FIG. 2 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

FIG. 3 illustrates an ISE 108 constructed in accordance with illustrative embodiments of the present invention. A shelf 114 defines cavities for receivingly engaging the controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
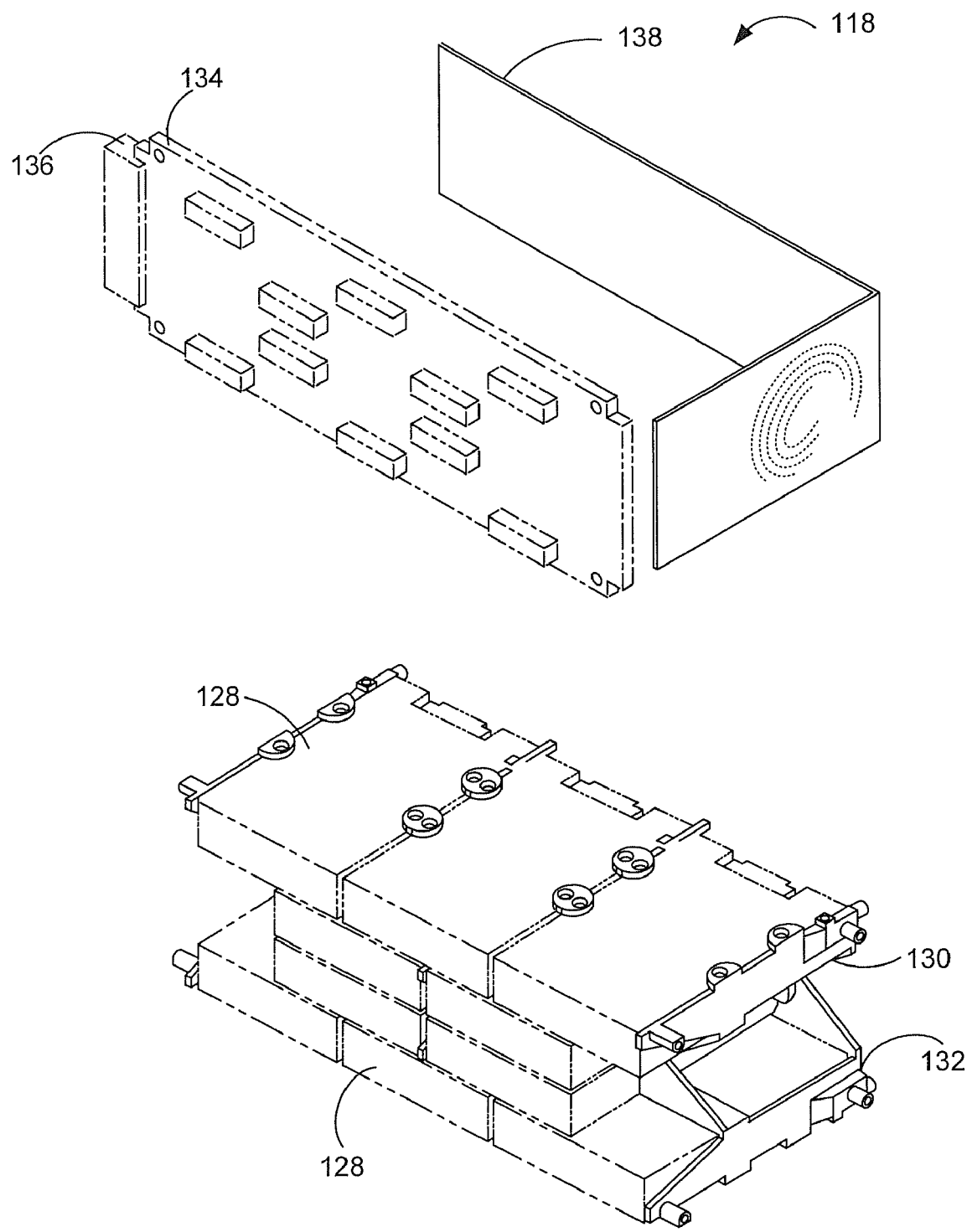
FIG. 4 is an exploded isometric view of a multiple drive array of the intelligent storage element of FIG. 3.

FIG. 4 is an enlarged exploded isometric view of the MDA 118 which has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of U.S. Pat. No. 7,133,291 entitled Carrier Device and Method for a Multiple Disc Array which is assigned to the assignee of the present invention and incorporated herein by reference. Another illustrative embodiment of the MDA 118 is the subject matter of U.S. Pat. No. 7,177,145 of the same title which is also assigned to the assignee of the present invention and incorporated herein by reference. In alternative equivalent embodiments the MDA 118 can be provided within a sealed enclosure.

Figure 5:
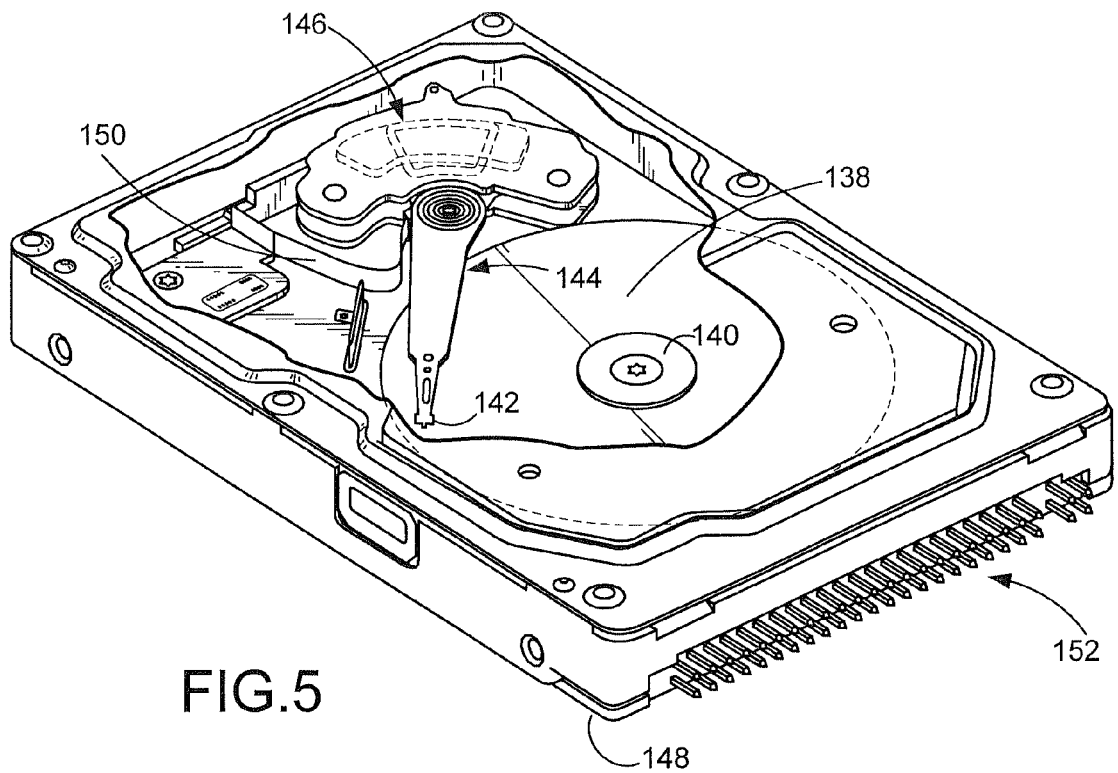
FIG. 5 is an exemplary data storage device used in the multiple drive array of FIG. 4.

FIG. 5 is an isometric view of the data storage device 128 suited for use with embodiments of the present invention and in the form of a rotating media disc drive. Although a rotating spindle with moving data storage medium is used for discussion purposes below, in alternative equivalent embodiments a non-rotating medium device, such as a solid state memory device is used. In the illustrative embodiments of FIG. 5 a data storage disc 138 is rotated by a motor 140 to present data storage locations of the disc 138 to a read/write head ("head") 142. The head 142 is supported at the distal end of a rotary actuator 144 that is responsive to a voice coil motor (VCM) 146 in moving the head 142 radially between inner and outer tracks of the disc 138. The head 142 is electrically connected to a circuit board 148 by way of a flex circuit 150. The circuit board 148 is adapted to receive and send control signals controlling the functions of the data storage device 128. A connector 152 is electrically connected to the circuit board 148, and is adapted for connecting the data storage device 128 with the circuit board 134 (FIG. 4) of the MDA 118.

Figure 6:
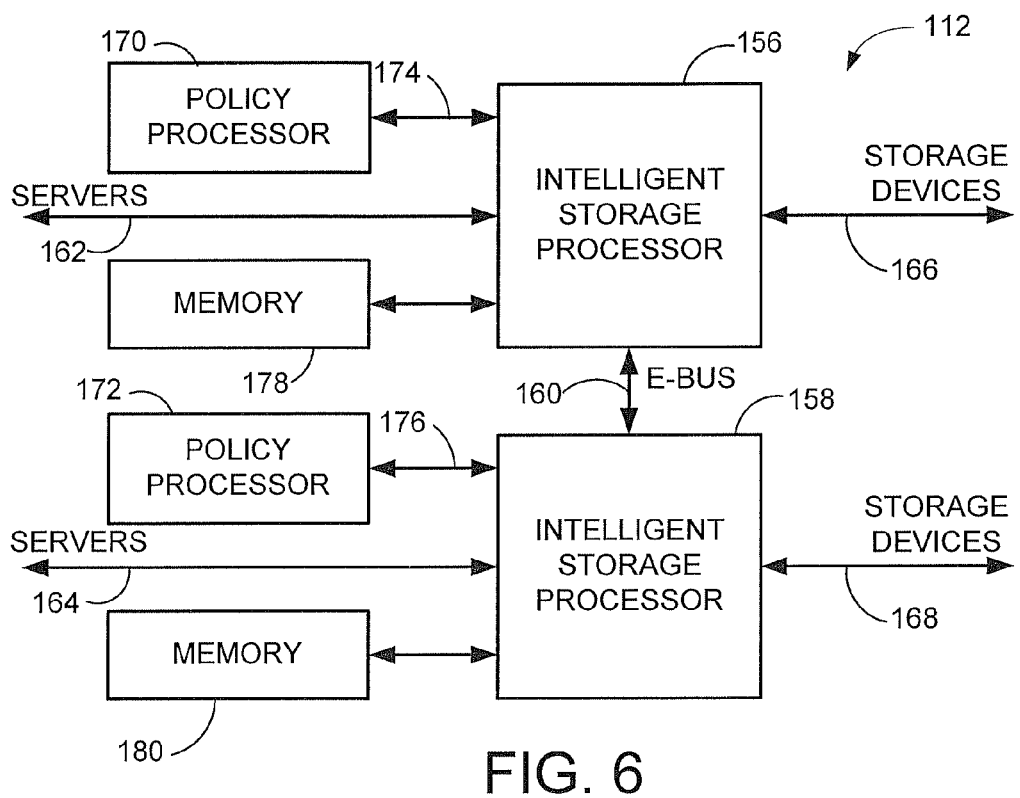
FIG. 6 is a functional block diagram of the array controller in the intelligent storage element.

FIG. 6 depicts the controller 112 (FIG. 2) architecture as having two intelligent storage processors (ISPs) 156, 158 coupled by an intermediate bus 160 (referred to as an "ebus"). Each of the ISPs 156, 158 is preferably disposed in a separate application specific integrated circuit (ASIC) package on a common controller board. Preferably, the ISPs 156, 158 each respectively communicate with upstream application servers via fibre channel server links 162, 164, and with storage devices making up the storage capacity 109 via fibre channel storage links 166, 168.

Policy processors 170, 172 execute a real-time operating system for the controller 112 and communicate with the respective ISPs 156, 158 via peripheral device busses 174, 176. The policy processors 170, 172 can further execute customized logic to perform sophisticated processing tasks in conjunction with the ISPs 156, 158 for a given storage application. The ISPs 156, 158 and the policy processors 170, 172 access memory modules 178, 180 as required during operation.

Figure 7:
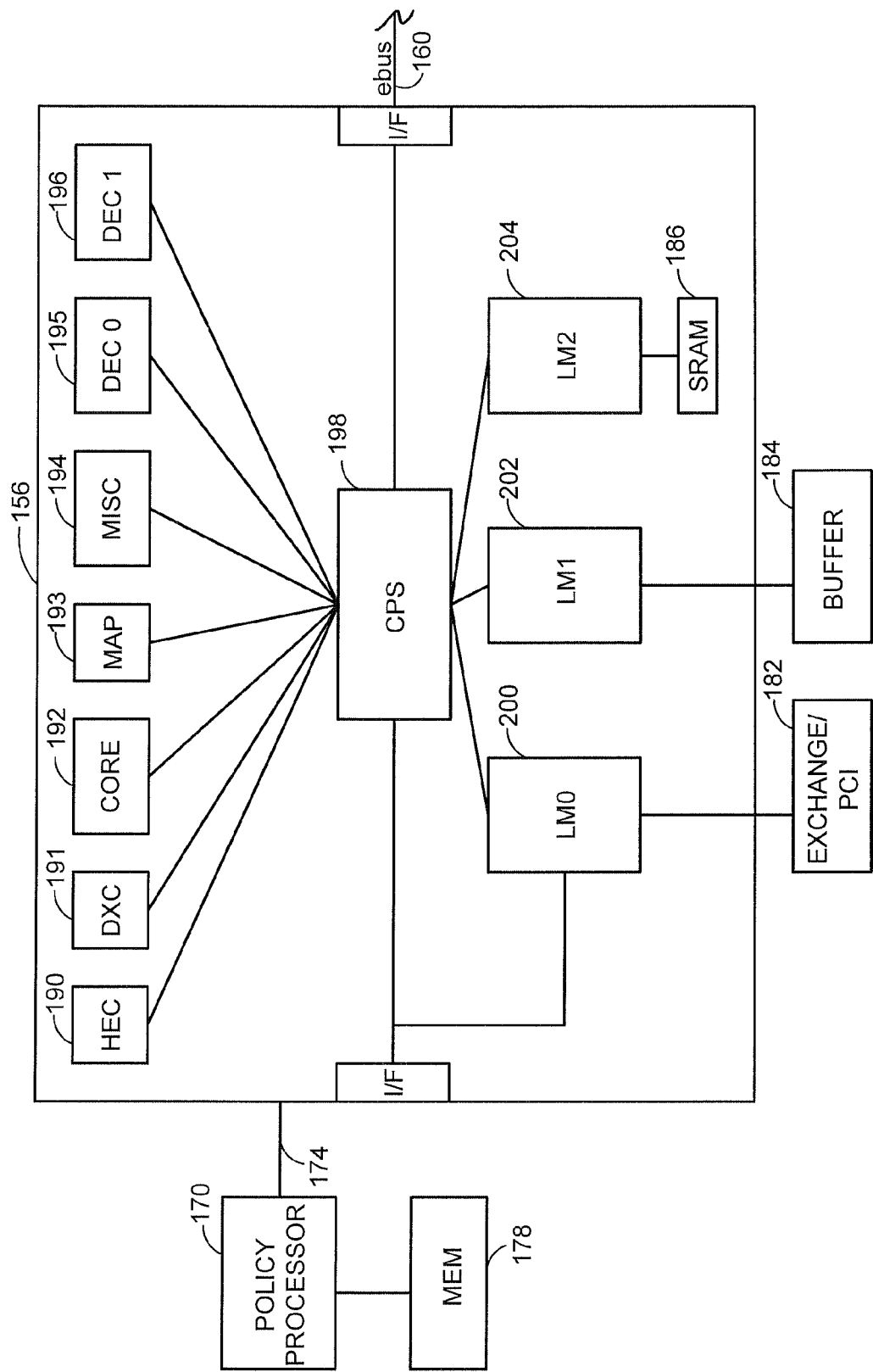
FIG. 7 is a more detailed functional block diagram of one side of the array controller of FIG. 6.

FIG. 7 depicts a portion of the controller 112 of FIG. 6, showing construction details of the ISP 156 and the corresponding policy processor 170 and memory 178. Although not depicted, the paired ISP 158 is of a like construction. The ISP 156 is coupled to an exchange/PCI memory module 182, a buffer memory module 184, and an SRAM module 186. The policy processor 170 accesses both the functionality of the ISP 156 as well as data stored in the memory modules via the peripheral device bus 174.

In the embodiments of FIG. 7 the ISP 156 has seven dedicated purpose function controllers (FCs) 190-196. A host exchange controller (HEC) 190 communicates with the front end fibre channel server link 162 (FIG. 6), and two disc exchange controllers (DEC0, DEC1) 195, 196 communicate with the back end fibre channel link storage link 166 (FIG. 6). The other dedicated purpose FCs are a DMA/XOR controller (DXC) 191, a command routing controller (CORE) 192, a metadata controller (MAP) 193, and a miscellaneous function controller (MISC) 194.

The FCs can access the memories 182, 184, 186 via an interconnect, such as a cross point switch (CPS) 198, and corresponding list managers (LMs) 200, 202, 204. Like the FCs, the LMs are hardware-intensive dedicated purpose processing elements. Each LM is optimized for use with specified data structure operations, with each LM maintaining its list of data structure responsibilities. That is, each data structure in the system is uniquely owned by only one of the LMs.

Figure 8:
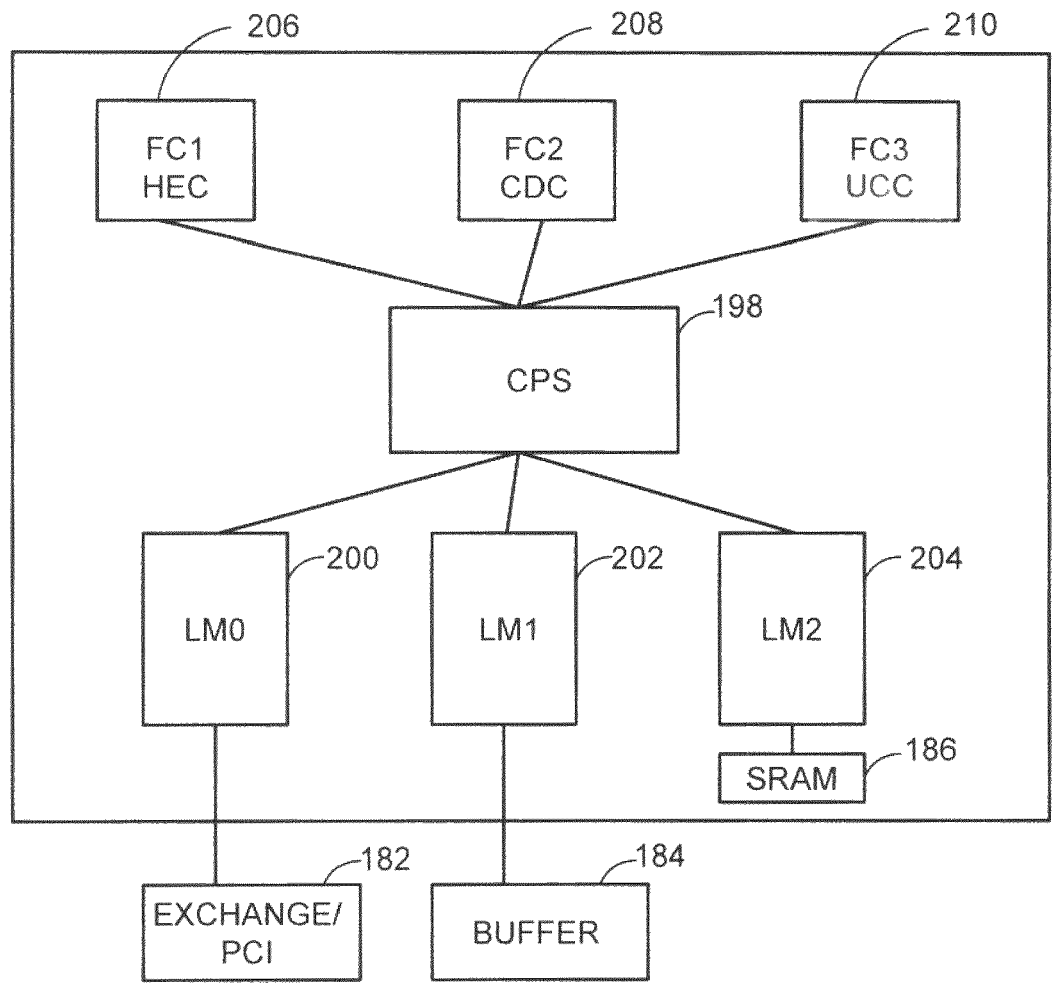
FIG. 8 is a functional block diagram of an array controller constructed in accordance with related art solutions.

It would be possible to perform storage transactions associated with a network I/O command entirely within the framework of the ISP 156 FCs and LMs, but the critical path of such transactions quickly becomes a long and relatively inefficient series of sub-transactions between the FCs and the LMs. For example, FIG. 8 depicts an ISP constructed in accordance with related art solutions having FCs programmed to perform the dedicated tasks of a HEC 206, a command decode function (CDC) 208, and a cache logic controller (UCC) 210. The following steps describe the critical path for performing a cache read with this controller architecture.

In step one, HEC 206 receives a read cache command from a requester via the server fibre channel link.

In step two, HEC 206 translates the transaction request and sends a corresponding request packet for a data transaction via the CPS 198 to LM0 200.

In step three, LM0 200 links the data transaction to the tail of an input queue of the CDC 208.

In step four, CDC 208 fetches the transaction from its input queue and decodes the data transaction into its respective compute and data structure operations.

In step five, CDC 208 generates a request packet to LM1 202 to have the data transaction moved to the UCC 210.

In step six, LM1 202 links the data transaction to the tail of an input queue of the UCC 210.

In step seven, UCC 210 generates one or more request packets for cache data structure operations to LM2 204.

In step 8, LM2 204 retrieves the requested data structures.

In step 9, LM2 204 generates a response packet that the requested data is ready for transfer.

In comparison, the embodiments of the present invention offload memory-intensive and compute-intensive functions such as the cache node lookup to the policy processor 170. That is, the storage system of the claimed embodiments performs storage transactions associated with network I/O commands with the ISP 156 interconnect 198 selectively coupling the plurality of FCs 190-196 to the policy processor 170 via LM0 200 communicating on the peripheral device bus 174 to which the policy processor 170 is connected. By way of this architecture the external processor interface (EPIF) of the ISP 156 provides the policy processor 170 with access via the peripheral device bus 174 to data structures stored in the exchange memory 182. As described below, the data structures are aligned with virtual stripe boundaries of the data storage capacity and describe corresponding data butlers in cache memory.

This "policy processor partnering" architecture increases the processing power of the controller 112 by reducing the number of sub-transactions involved. For example, the critical path for a cache read is considerably shorter for the controller 112 of FIG. 7 and the present embodiments, as compared to the controller of FIG. 8 discussed above.

Step one is the same, HEC 190 receives a read cache command from a requester via the server fibre channel link.

In step two the HEC 190 translates the transaction request and sends a corresponding request packet for a data transaction via the CPS 198 to LM0 200.

However, in step three LM0 200 posts the data of the transaction directly to the policy processor 170 which decodes the data transaction, validates data in cache, and performs a cache lookup.

Figure 9:
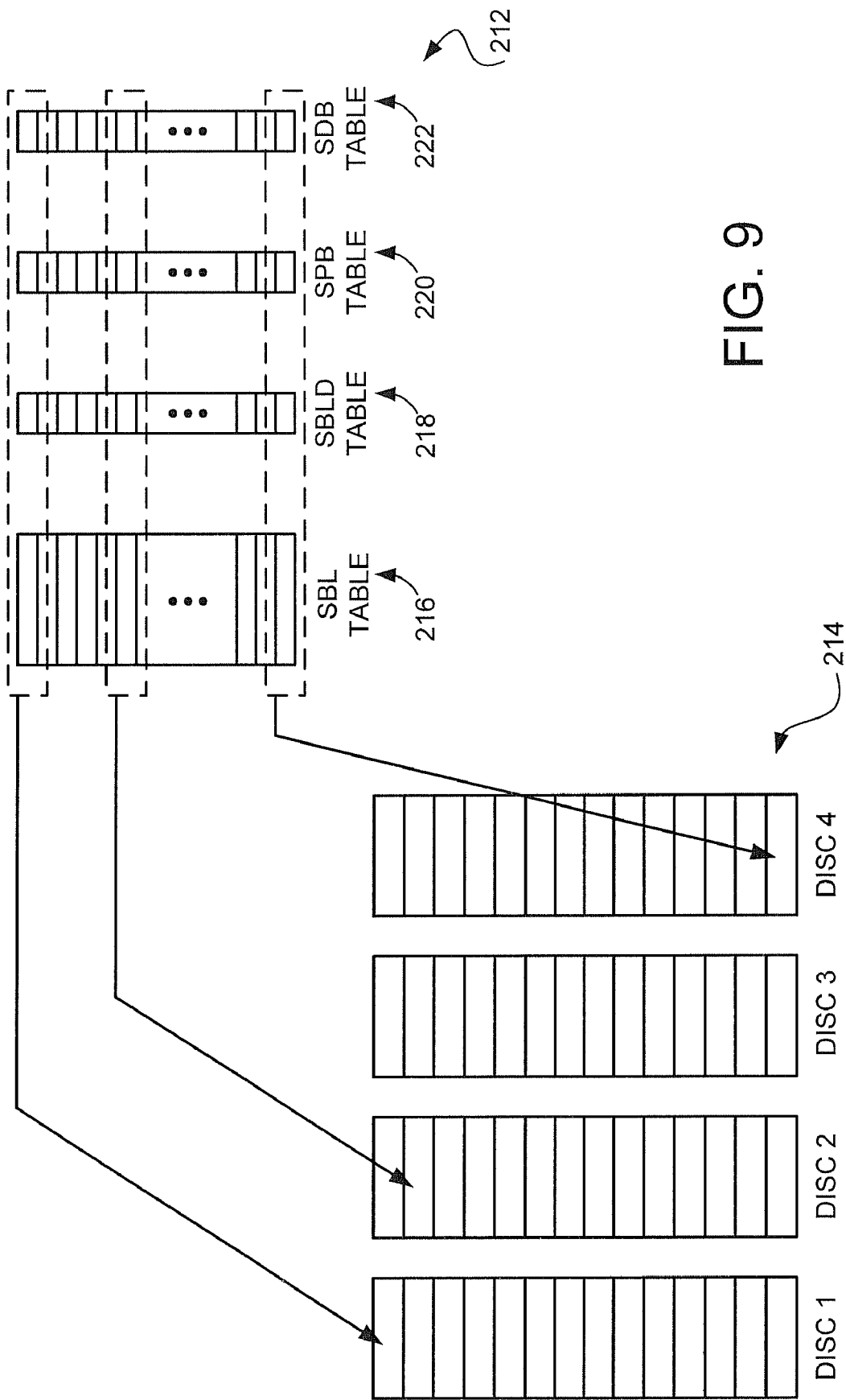
FIG. 9 diagrammatically depicts SBL, SBLD, SPB and SDB metadata.

FIG. 9 illustrates exemplary metadata structures 212 that are used by the policy processor 170 to manage the striped storage discs 214. A stripe buffer list (SBL) table 216 includes a plurality of SBLs that are aligned with virtual stripes on a storage medium, and include one or more buffer indices referencing corresponding data buffer addresses in the cache memory. The policy processor 170 executes programming instructions stored in memory to index the SBL table 216 according to the VBA and pool associated with the storage transaction, thereby computing an association between the storage transaction with a stripe in the storage capacity 109.

The policy processor 170 manages the cache on a node basis using a stripe buffer list descriptor (SBLD) in a corresponding table 218. Each SBLD holds data that describes the RAID stripe, namely the starting virtual block address (VBA) and the logical disc ID, and some non-volatile state of the stripe with which it is associated. Each SBLD conforms with a data structure in policy processor memory, the stripe data descriptor (SDD), which holds data concerning recent and current accesses. Both the SBLD and SDD conform to a particular stripe buffer list (SBL).

Each cache node managed by the policy processor 170 preferably references some particular SDD, with active SDD structures for a given set of logical discs being preferably linked in ascending order via a virtual block address (VBA) using forward and backward linked lists. Preferably, the VBA values are aligned with the RAID data organization using a grid system sometimes referred to as a RAID Allocation Grid System (RAGS). Generally, any particular collection of blocks belonging to the same RAID stripe (e.g., all of the data contributing to a particular parity set) will be assigned to a particular reliable storage unit (RSU) on a particular sheet. A book consists of a number of sheets and is constructed from multiple contiguous sets of blocks from different storage devices. Each SDD preferably includes variables that indicate various states of the data, including access history, locked status, last offset, last block, timestamp data (time of day, TOD), identifiers to which zone (book) the data belong, and RAID level employed.

A stripe buffer list present bits (SPB) table 220 and a stripe buffer list dirty bits (SDB) table 222 enable the policy processor 170 to manage the data buffers in the cache memory. The SPB table 220 includes a bit for each sector of each SBL to indicate whether the cached data for a given sector is or is about to be valid (i.e., has current data for the corresponding sector). It also indicates that the buffer index is valid. In subsequent exchange requesting a read operation to the same sector, if the SPB table 220 indicates that the data is valid, then the request can be serviced from the buffer memory instead of requiring a round trip to the storage medium. The SDB table 222 includes a bit for each sector of the SBL to indicate whether the cached data for a given sector is "dirty" (i.e., needs to be written from the data buffer). For example, if the storage controller loses power in the middle of an exchange, the SDB table 222 can be used to indicate that the data in the cache needs to be flushed to the appropriate target. Therefore, when the storage controller reboots, data integrity is maintained in the presence of a catastrophic event.

After the cache lookup is completed, the policy processor 170 allocates memory for and populates an active context entry (ACE) for carrying out the data transaction. If the data transaction is directed to the HEC 190 in the host exchange range, such as in the case of a cache hit, then the context takes the form of a front active context entry (FACE). An exemplary format for a FACE for a SCSI target I/O assist is as follows:

| | | |
|---|---|---|
| 0 | Flags | |
| 1 | Script/Stage | |
| 2 | SBL Index | [or Buffer Index] |
| 3 | Blocks/Offset | [or Byte Count] |
| 4 | Status | |
| 5 | CORE Tag Link | |
| 6 | Destination ID High | |
| 7 | Destination ID Low | |
| 8 | Real SBL Index | [or Response Frame Length] |
| 9 | Real Additional SBL Index | [or HSR Index] |
| 10 | VBA High | [31:16] |
| 11 | VBA Low | [15:0] |
| 12 | Relative Offset | [Sectors] |
| 13 | OXID | |
| 14 | Check Tag | |
| 15 | Additional SBL Index | |

The "Flags" value is defined as follows:

| | | |
|---|---|---|
| 0x8000 | Inactive | [0 => ACE Active] |
| 0x4000 | Remote | [1 => Remote Execution] |
| 0x2000 | Sector Size | [0 = 512, 1 = 520] |
| 0x0C00 | Burst Length | [(x + 1) * Sector Size] |
| 0x0200 | Send Good Status | [1 => Send SCSI Good] |
| 0x0100 | Aborted | [1 => Aborted] |
| 0x0080 | Previous Dirty | [1 => Atomic Write Dirty] |
| 0x0040 | Mirror Data | [1 => Also Mirror Data] |
| 0x0020 | Non-Sector Data | [1 => Not Sector Data] |

-continued

| | | |
|---|---|---|
| 0x0010 | Remote Data | [1 => Data on Other Nacelle] |
| 0x0008 | Target | [1 => Target] + Command Queue: |
| 0x0006 | Command Queue | 0 DEC 0 New Command |
| | | 1 DEC 1 New Command |
| | | 2 HEC New Command |
| | | 4 HEC Inbound |
| | | 5 HEC Outbound |
| | | 6 HEC New Command |
| 0x0001 | Use Mirror | [1 => Data in THIS Mirror] |

The "Non-Sector Data" flag signals that a SCSI non-sector data command is being processed. The location to get or put data is defined by the "Buffer Index" field. The amount of data to transfer is found in the "Byte Count" field. The "Aborted" flag indicates the request has been aborted prior to arriving. The status should be set appropriately and the FACE returned to the CORE after incrementing the "Stage" field. The "Mirror Data" flag requests that the data also be mirrored across the ebus 160. It can apply to non-sector data as well as normal sector data. The "Burst Length" field defines the number of sectors that should be used to fill a fiber channel frame. The frame size is computed as the "Sector Size" * ("Burst Length"+1) plus 32 for the header. For example, if "Sector Size" is 1 (520) and "Burst Length" is 3, then the frame size is 520*4+32=2112.

The "Remote Data" flag indicates that the buffer memory to be accessed is across the ebus 160 from the other ISP 158. When the "Remote" flag is also set, the HEC 190 should invert the "sense" of the "Use Mirror" flag to determine which buffer and SBL pool to access.

Returning to the FACE format, the "Script" value selects one of several predefined scripts of a sequence of steps, which when completed, result in corresponding "cases." The "Stage" value indicates which step is to be executed. This architecture increases processing performance in that for a given request, multiple stages can be completed by the ISP 156 before completion is responded to the policy processor 170.

The "Blocks" field defines the transfer size in sectors, with 0 meaning 256. The "Offset" field defines the starting offset within the "disk stripe." It is the starting sector offset in the SBL and the low-order byte of the starting LBA. When the transfer size is 0, it implies a transfer size of 256. The HEC uses the "Destination ID" field to fill in context or build FCP_HDR data. For target writes, in the case where a write of the maximum atomic write size (128 KB) crosses a "disk stripe" (SBL) boundary, the "Additional SBL Index" references the second SBL. This case is detected by the fact that the "Offset" plus the "Blocks" value is greater than 256. The "Real SBL Index" and "Real Additional SBL Index" are only used for the special case of "atomic write" involving a write where some or all of the sectors are already "dirty" in the cache. The "Relative Offset" field defines the number of sectors preceding this portion of a SCSI target assist.

The "Status" field is used to convey particulars about errors detected with regard to target I/O requests. The values for "Status" are as follows:

| | | |
|---|---|---|
| 0 | Completed - Success | [Success] |
| 1 | Completed - SCSI Error | |
| 2 | Programming Error | |
| 3 | Could Not Open ALPA | |
| 4 | Aborted - Partner | |
| 5 | DIF Bad Tag Detected | |
| 6 | DIF Bad EDC Detected | |
| 7 | Rejected - Pool Access Prohibited | |
| 8 | Dropped Frame Detected | |
| 9 | Aborted - ABTS | |
| 10 | Compare Error | |
| 11 | DIF Summary OK | |
| 12 | DIF Summary Error | |
| 13 | Remote Programming Error | |

Contrarily, if the data transaction is directed to DEC0 195 or DEC1 196 in the pool exchange range, such as in the case of a cache miss, then the context takes the form of a pool active context entry (PACE). An exemplary format for a PACE in a SCSI read, verify, write, or write verify command is as follows:

| | | |
|---|---|---|
| 0 | Flags | |
| 1 | Script | Stage | |
| 2 | SBL Index | |
| 3 | Blocks | Offset | |
| 4 | Status | |
| 5 | CORE Tag Link | |
| 6 | [HEC: LUN | DID High] | |
| 7 | [HEC: DID Low] | {Response Byte Count} |
| 8 | Extended LUN | PCI Cache Line High | [12:8] | [26:16] |
| 9 | PCI Cache Line Low | [15:0] |
| 10 | VBA High | [31:16] |
| 11 | VBA Low | [15:0] |
| 12 | LBA High | [31:16] |
| 13 | LBA Low | [15:0] |
| 14 | Check Tag | |
| 15 | Substitute Tag | |

The "Flags field is defined as follows:

| | | |
|---|---|---|
| 0x8000 | Inactive | [0 => ACE Active] |
| 0x4000 | Remote | [1 => Remote Execution] |
| 0x0800 | Skip Dirty | [1 => Discard When Block Dirty] |
| 0x0400 | Substitute Tag | [1 => Set Substitute Tag Flag] |
| 0x0200 | Verify | [1 => Write Verify OR Verify With Data] |
| 0x0100 | Aborted | [1 => Aborted] |
| 0x0080 | Write | [0 => Read] |
| 0x0040 | Mirror Data | [Does Not Apply] |
| 0x0030 | I/O Type | [0 => Read/Write Command] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [1 => Data in THIS Mirror] |

The "Substitute Tag" flag causes special behavior with regard to manipulation of the DIF data. This can occur for both read and write operations. If the "Check Tag" field is not the value 0xFFFF or 0xFFFE, the "incoming" tags ("META Tag" and "REFERENCE Tag") should be checked against the expected tags ("Check Tag" and "VBA") but the "Substitute Tag" should be substituted. Because of the hardware requirements, the "VBA" will also be substituted and a correct CRC will replace the current CRC. That is, an entirely new DIF field will be generated and substituted. If the "Check Tag" field has a value of 0xFFFF, there will be incoming DIF data and the CRC, of course, must be assumed to be correct. However, the "REFERENCE Tag" (VBA) and "META Tag" values should be ignored. That is, no "tag" errors should be generated. If the "Check Tag" field has a value of 0xFFFE, tag and CRC errors should be ignored.

When a status other than "SCSI Good" is received, the first 256 bytes or less of the FCP_RSP frame will be stored in the "ELS Response Table" (ERT). The "Response Byte Count" will reflect the actual number of bytes in the FCP_RSP frame. It is not to be updated unless a status other than "SCSI Good" with no special flags set is received.

The SCSI "Long Transfer" command request is used to issue "standard" SCSI commands where the transfer crosses a "RAID stripe" boundary and exceeds 256 sectors in length. The format of a PACE for this operation is as follows:

| | | |
|---|---|---|
| 0 | Flags | |
| 1 | Script \| Stage | |
| 2 | SBL Index | |
| 3 | Blocks | |
| 4 | Status | |
| 5 | CORE Tag Link | |
| 6 | [HEC: LUN \| DID High] | |
| 7 | [HEC: DID Low] | {Response Byte Count} |
| 8 | Extended LUN \| PCI Cache Line High | [12:8] \| [26:16] |
| 9 | PCI Cache Line Low | [15:0] |
| 10 | VBA High | [31:16] |
| 11 | VBA Low | [15:0] |
| 12 | LBA High | [31:16] |
| 13 | LBA Low | [15:0] |
| 14 | Check Tag | |
| 15 | Substitute Tag | |

The field definitions are essentially the same as for the "standard" SCSI commands described above. The "Blocks" field will always be greater than "256". The controller 112 will build the SCSI CDB as usual based on the desired number of blocks to be written, which will be taken from the entire contents of word 3. Aside from this, processing for this type differs from processing for the type 0 "normal" SCSI command only in the handling of the data transfer part. The logic must detect instances where the end of an SBL is encountered. It must then fetch both a new "SBL Index" and a new "VBA Low" value from the ACE correlated data (ACD) based on the offset that the transfer has reached. The logic shall assume that the initial offset into the SBL is "0." The initial and subsequent "VBA Low" values shall have a low byte value of "0." The maximum transfer supported shall be 2 MB (4096 sectors).

The usage of the "Flags" field for the "Long Transfer" variant is as follows:

| | | |
|---|---|---|
| 0x8000 | Inactive | [0 => ACE Active] |
| 0x4000 | Remote | [1 => Remote Execution] |
| 0x0800 | Skip Dirty | [1 => Discard When Block Dirty] |
| 0x0400 | Substitute Tag | [1 => Set Substitute Tag Flag] |
| 0x0200 | Verify | [1 => Write Verify OR Verify With Data] |
| 0x0100 | Aborted | [1 => Aborted] |
| 0x0080 | Write | [0 => Read] |
| 0x0040 | Mirror Data | [Does Not Apply] |
| 0x0030 | I/O Type | [1 => Long Transfer] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [1 => Data in THIS Mirror] |

Support is required for a number of SCSI commands that either have no data or use non-sector data. For example, the SCSI "Test Unit Ready" command has no data. The SCSI "Verify" command when so specified will have no data. The SCSI "Mode Sense" expects data that is not related to sectors on the disk drive. The SCSI "Mode Select" command sends data that is not related to sectors on the disk drive. For SCSI commands with non-sector data, the amount of data will be defined by the "Byte Count" field. A "Byte Count" value of "0" is to be interpreted as 65536. The maximum outbound transfer shall be 16384. The "raw" DMA mode will be required to transfer the data to or from the ISP 156 FIFOs. The initial source or final destination of data will be a buffer in partner memory specified by a PCI "Cache Line." The DXC 191 will move data between a temporary buffer in Buffer Memory 184 and PCI memory 182 or between a "super buffer" and PCI memory 178. A "super buffer" is a set of consecutive buffers defined by the first buffer in the set.

The format for a PACE for SCSI commands that don't involve sector data is as follows:

| | | |
|---|---|---|
| 0 | Flags | |
| 1 | Script \| Stage | |
| 2 | Buffer Index | |
| 3 | Byte Count | |
| 4 | Status | |
| 5 | CORE Tag Link | |
| 6 | [HEC: LUN \| DID High] | |
| 7 | [HEC: DID Low] | {Response Byte Count} |
| 8 | Extended LUN \| PCI Cache Line High | [12:8] \| [26:16] |
| 9 | PCI Cache Line Low | [15:0] |
| 10-15 | [Unused] | |

The "Buffer Index" field defines which buffer in Buffer Memory to use. It will reference a temporary buffer allocated by the CORE 192 or a "super buffer." The "PCI Cache High" (11 bits) and "PCI Cache Line Low" fields define the PCI address used by the DXC 191 to move the data to or from the buffer in BM 184. This address is computed as follows:

PCI Address=("PCI Cache Line High"<<21)+("PCI Cache Line Low"<<5);

The usage of the "Flags" field for these variants is as follows:

| | | |
|---|---|---|
| 0x8000 | Inactive | [0 => ACE Active] |
| 0x4000 | Remote | [1 => Remote Execution] |
| 0x0800 | Skip Dirty | [Does Not Apply] |
| 0x0400 | Substitute Tag | [Does Not Apply] |
| 0x0200 | Verify | [Does Not Apply] |
| 0x0100 | Aborted | [1 => Aborted] |
| 0x0080 | Write | [1 => Data Out] |
| 0x0040 | Mirror Data | [Does Not Apply] |
| 0x0030 | I/O Type | [2 => Non-Sector Data] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [Does Not Apply] |

The SCSI command without data case can be determined by the fact that the "Byte Count" field in the PACE will be zero. The "Write" flag determines the "Data Out" versus "Data In" case. The policy processor 170 will build the entire Fiber Channel FCP_CMND frame in the corresponding ACD. This frame will be 68 bytes and include the SOFix and EOF "words" as well as the place for the CRC-32 data "word."

For "Data In" cases, the target may legitimately return less data than was requested. In this case, the "Byte Count" field determines the maximum to be received. When less is received, the "Byte Count" field should be updated. It will eventually be returned to the partner. Also, the FCP_RSP frame will need to be checked to determine that the right amount of data was returned.

The storage pool ordinal tag (SPOT) is still derived from the CORE Tag as is the OXID which determines where to stash the initiator request context (IRC) and which ISP 156 context area to use. The other major class for fibre channel service that needs to be supported is "Link Services." For outgoing frames, this service will invoke a "Single Frame Sequence" (SFS) mechanism. The format for the PACE for the SFS mechanism is:

| | | |
|---|---|---|
| 0 | Flags | |
| 1 | Script \| Stage | |
| 2 | Data CORE Tag | |
| 3 | Byte Count | |
| 4 | Status | |
| 5 | CORE Tag Link | |
| 6-15 | Unused [20 Bytes] | |

If the "Data CORE Tag" field is non-zero, it defines a miscellaneous active context entry (MACE) index that references the second block of frame data in the ACD table. It will only be required for frames greater than 256 bytes. The first 256 bytes of the frame are stored in the ACD entry corresponding to the PACE. The frame contains the SOFix and a place for the CRC-32 data word as well as EOFx word. Note that the PACE does not have to lie in the normal PACE range. It could actually be a MACE. The FCC will not utilize the CORE Tag of the PACE itself to derive any useful information. The SFS mechanism will use one of the ISP 156 context areas in the range 0-3.

The usage of the "Flags" field for the SFS service is as follows:

| | | |
|---|---|---|
| 0x8000 | Inactive | [0 => ACE Active] |
| 0x4000 | Remote | [1 => Remote Execution] |
| 0x0400 | Substitute Tag | [Does Not Apply] |
| 0x0200 | Verify | [Does Not Apply] |
| 0x0100 | Aborted | [Does Not Apply] |
| 0x0080 | Write | [Does Not Apply] |
| 0x0040 | Mirror Data | [Does Not Apply] |
| 0x0030 | I/O Type | [3 => SFS Service] |
| 0x0008 | Target | [0 => Not Target] |
| 0x0006 | Command Queue | 0 DEC 0 New Command |
| | | 1 DEC 1 New Command |
| | | 2 HEC New Command |
| | | 3 [Unused] |
| 0x0001 | Use Mirror | [Does Not Apply] |

Generally, as described, the claimed embodiments contemplate a storage system having an intelligent storage processor ASIC with a plurality of dedicated purpose function controllers selectively coupled to a plurality of list managers, and means for processing I/O transactions with the intelligent storage processor by maintaining top level control for all I/O transactions by a policy processor peripheral device to the ASIC. For purposes of this description and meaning of the appended claims the phrase "means for processing" expressly includes the structure disclosed herein and equivalents thereof that permit an FC to have access to the policy processor via the list manager and the peripheral bus to which the policy processor is connected. For purposes of this description and meaning of the appended claims "means for processing" does not contemplate related attempted solutions wherein the transactions are processed entirely by the ISP, or in other words processed in a structure in which the policy processor does not maintain top level control of the functionality of the ISP.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed:

1. A storage system performing a storage transaction associated with an input/output (I/O) command communicated within a network device via a network, the storage system comprising:
   an application specific integrated circuit (ASIC) having an interconnect device selectively coupling a plurality of dedicated purpose function controllers in the ASIC with a list manager in the ASIC;
   a policy processor that executes an operating system;
   a peripheral device bus operably coupling the policy processor to the plurality of dedicated purpose function controllers via the list manager and not via the network; and
   cache lookup logic executed by the policy processor to, in response to the I/O command, communicate with the list manager via the peripheral device bus to access a memory in which data structures are stored to perform a cache lookup for data corresponding to the I/O command.

2. The storage system of claim 1 wherein some data structures being aligned with virtual stripe boundaries of a data storage capacity in the storage system describing corresponding data buffers of a cache memory in the storage system.

3. The storage system of claim 2 wherein the cache lookup logic comprises programming instructions stored in a memory and executed by the policy processor to compute a data structure associated with the storage transaction.

4. The storage system of claim 3 wherein the computed data structure indicates a buffer address in the cache memory associated with the storage transaction.

5. The storage system of claim 3 wherein the computed data structure associates the storage transaction with a stripe in a storage capacity in the storage system.

6. The storage system of claim 3 wherein the computed data structure identifies valid data in buffers of cache memory.

7. The storage system of claim 3 wherein the computed data structure identifies dirty data in buffers of the cache memory.

8. The storage system of claim 1 wherein the cache lookup logic comprises programming instructions executed by the policy processor to format a context data structure for the storage transaction in a memory via the interconnect and the list manager.

9. The storage system of claim 8 wherein the context data structure is formatted for the storage transaction being a front end storage transaction between one or more of the function controllers and the network device.

10. The storage system of claim 8 wherein the context data structure is formatted for the storage transaction being a back end storage transaction between one or more of the function controllers and a storage capacity in the storage system.

11. A method for processing storage transactions in a storage system comprising:
   receiving an access command from a network device via a network by a dedicated purpose host exchange function controller within an application specific integrated circuit (ASIC);
   posting a command associated with the access command by the host exchange function controller to a policy processor that executes an operating system via a list manager in the ASIC and a peripheral device bus to which the policy processor is connected, the posting step not communicated via the network; and
   decoding the command with the policy processor and responsively communicating the decoded command with the list manager via the peripheral device bus to access a memory in which data structures are stored to perform a cache lookup for data corresponding to the command.

12. The method of claim 11 wherein the decoding step comprises the policy processor accessing metadata describing data buffers in a cache memory associated with the storage transaction.

13. The method of claim 12 wherein the decoding step comprises the policy processor computing metadata in relation to a virtual block address specified in a command associated with the storage transaction.

14. The method of claim 13 wherein the decoding step derives metadata indicating a buffer address in the cache memory associated with the storage transaction.

15. The method of claim 13 wherein the decoding step derives metadata associating the storage transaction with a stripe in the storage capacity.

16. The method of claim 15 wherein the decoding step derives metadata identifying valid data in the buffers of cache memory.

17. The method of claim 13 wherein the decoding step identifies dirty data in the buffers of the cache memory.

18. The method of claim 11 wherein the decoding step comprises the policy processor formatting a context data structure for the storage transaction in a memory via the interconnect.

19. The method of claim 18 wherein the formatting a context step is characterized by the context data structure being formatted for one of a front end data transaction, between one or more of the function controllers and the network device, and a back end data transaction, between one or more of the function controllers and a storage capacity in the storage system.

20. A storage system comprising:
   an intelligent storage processor (ISP) ASIC operably communicating with a network device via a network, the ISP having a plurality of dedicated purpose function controllers selectively coupled to a plurality of list managers; and
   means for processing input/output (I/O) transactions from the network device with the ISP by maintaining top level control of cache lookups for all respective I/O transactions by a policy processor peripheral device executing an operating system and communicating with the list manager in the ASIC to access data structures that are stored in memory and are associated with the cache lookup.

* * * * *